United States Patent [19]
Dvorkis et al.

[11] Patent Number: 5,386,107
[45] Date of Patent: Jan. 31, 1995

[54] SCANNING ARRANGEMENT AND METHOD IN WHICH THE FOCUS IS VARIED IN OPERATIVE CORRELATION WITH THE SCANNING ANGLE

[75] Inventors: Paul Dvorkis; Joseph Katz, both of Stony Brook, N.Y.

[73] Assignee: Symbol Technologies, Inc., Bohemia, N.Y.

[21] Appl. No.: 812,604

[22] Filed: Dec. 23, 1991

[51] Int. Cl.$^6$ ............................................. G06K 7/10
[52] U.S. Cl. .................... 235/472; 235/462; 235/467; 359/824
[58] Field of Search ............... 235/462, 467, 472, 463; 359/824, 822, 823; 250/568

[56] References Cited

U.S. PATENT DOCUMENTS

| | | | |
|---|---|---|---|
| 4,004,852 | 1/1977 | Penecost | 356/1 |
| 4,251,798 | 2/1981 | Swartz et al. | 235/462 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,720,185 | 1/1988 | Kurihara | 359/824 |
| 4,760,248 | 7/1988 | Swartz et al. | 235/472 |
| 4,794,239 | 12/1988 | Allais | 235/462 |
| 4,808,804 | 2/1989 | Kricheuer et al. | 235/462 |
| 4,816,920 | 3/1989 | Paulsen | 359/824 |
| 4,818,886 | 4/1989 | Drucker | 235/462 |
| 4,831,275 | 5/1989 | Drucker | 250/566 |
| 4,896,026 | 1/1990 | Krichever et al. | 235/472 |
| 4,897,532 | 1/1990 | Swartz et al. | 235/467 |
| 4,916,318 | 4/1990 | Iima | 250/568 |
| 4,920,255 | 4/1990 | Gabeler | 235/454 |
| 4,933,538 | 6/1990 | Heiman et al. | 235/462 |
| 5,010,242 | 4/1991 | Frontino | 235/467 |
| 5,105,833 | 4/1992 | Mattei et al. | 131/281 |
| 5,115,121 | 5/1992 | Bianco et al. | 235/467 |
| 5,122,644 | 6/1992 | Hasegawa et al. | 235/462 |
| 5,170,277 | 12/1992 | Bard et al. | 235/462 |
| 5,223,700 | 6/1993 | Takenaka | 235/467 |
| 5,250,791 | 10/1993 | Heiman et al. | 235/467 X |

FOREIGN PATENT DOCUMENTS

| | | | |
|---|---|---|---|
| 0191838 | 11/1982 | Japan | 359/824 |
| 61-204277 | 12/1986 | Japan . | |

OTHER PUBLICATIONS

"Optical System Design", by Rudolph Kingslake, pp. 73–74; Dec. 1983.
Applied Optics Journal, vol. 24, No. 12, Jun. 1985, p. 1732, "Magnification Equations for a Two–Lens System"; by D. S. Goodman.
NASA Tech Briefs, May 1987, pp. 33–34, "Scanning System for Laser Velocimeter", Ames Research Center.
NASA Tech Briefs, Oct. 1987, pp. 44 & 46, "Ultrasonic Ranging System with Increased Resolution", L. B. Johnson Space Center.

*Primary Examiner*—Donald Hajec
*Assistant Examiner*—Esther H. Chin

[57] ABSTRACT

A device for reading indicia on a target in which the indicia has regions of differing light reflectivity. The device directs a light beam toward the indicia, and collects reflected light from the indicia. The focus of the light beam is varied to enable the device to read indicia at different working distances, and the maximum scanning angle of the light beam is varied in operative correlation with the focus.

19 Claims, 3 Drawing Sheets

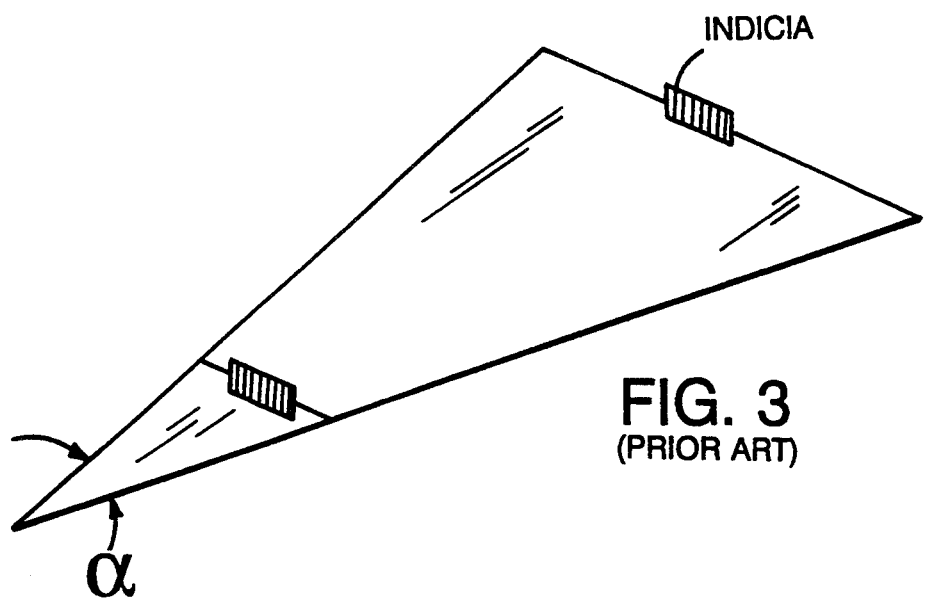
FIG. 3
(PRIOR ART)
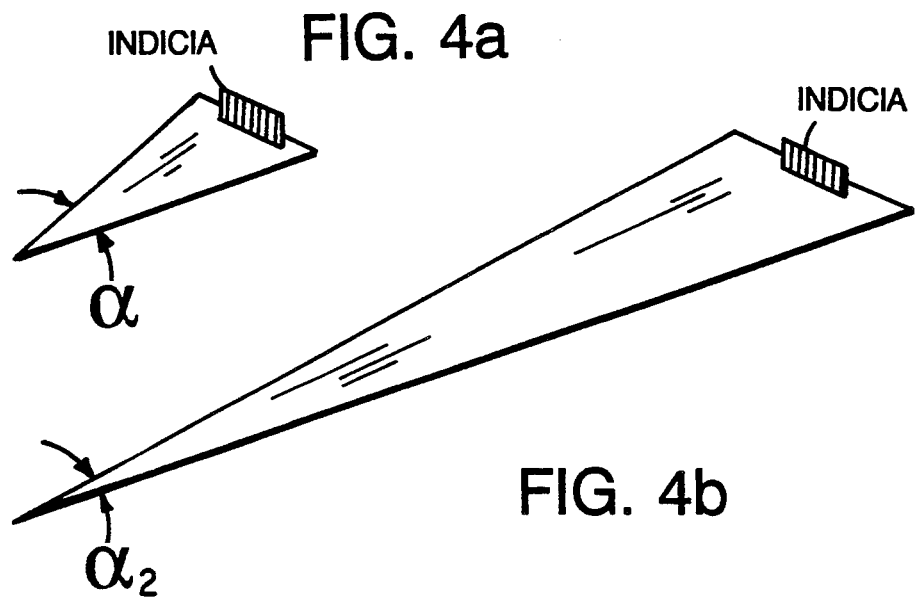
FIG. 4a
FIG. 4b

SCANNING ARRANGEMENT AND METHOD IN WHICH THE FOCUS IS VARIED IN OPERATIVE CORRELATION WITH THE SCANNING ANGLE

BACKGROUND OF THE INVENTION

The present invention relates to a scanning device for reading indicia on a target in which the indicia has regions of different reflectivity, such as a bar code symbol, and more particularly relates to a scanning device automatically enabling the scanning of indicia at various scanning ranges.

The utilization of laser scanning devices for the scanning or reading of information provided on a target; such as a package or sale item, is well known in this particular technology and has found wide acceptance in commerce. In this connection, various types of laser scanning devices incorporate scanning heads which house optical reading systems, such as bar code readers, for the reading of information or bar code symbols on targets which are scanned by a laser beam projected from the bar code reader. In general, such laser scanning devices; especially those in the type of bar code readers, are widely employed in industry, such as manufacturing, shipping, and in retail commerce and; for example, may be permanently incorporated in the structures of check-out counters of supermarkets, whereby the items of merchandise having the bar code symbols imprinted thereon or applied thereto are passed over a fixed bar code reader located beneath the counter surface so as to provide a record for the merchant of the merchandise being purchased by a consumer, and concurrently a readout (and possibly a printed record) for the consumer.

Alternatively, the bar code reader or laser scanning device may also be constituted of an optical scanner unit which is fixedly mounted on a stand extending above a support platform or countertop on which the merchandise may be arranged; or in many instances of utilization, pursuant to a preferred embodiment of the invention, may be in the form of a miniature, lightweight and gun-shaped device having a pistol grip, and in which the actived device is normally passed over the bar code symbol which is imprinted on a sale item or target at some short distance therefrom so as to enable scanning and reading of the information provided by the bar code symbols.

DISCUSSION OF THE PRIOR ART

Various optical readers and optical scanning systems have been developed heretofore for reading bar code symbols appearing on a label or on the surface of an article. The bar code symbol itself is a coded pattern of indicia which comprises a series of bars of various widths spaced apart from one another to bound spaces of various widths. The bars and spaces having different light-reflecting characteristics. The readers and scanning systems electrooptically transform the graphic indicia into electrical signals, which are decoded into alphanumerical characters that are intended to be descriptive of the article or some characteristic thereof. Such characters are typically represented in digital form and utilized as an input to a data processing system for applications, in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

Furthermore, in addition to the above-mentioned patents, there are also known scanning devices and systems which enable the scanning and reading of indicia, such as bar codes or the like, through the intermediary of scanning devices providing for variable scanning spot sizes and focusing arrangements for reading indicia at widely differing scanning distances.

Furthermore, U.S. Pat. No. 5,010,242 discloses a method and apparatus for the variable speed scanning of bar codes in which a scanner is oscillated relative to a stationary optical and beam generating system to allow for the rapid scanning of the bar codes at various ranges. U.S. Pat. No. 4,920,255 discloses an automatic incremental focusing scanner system in which microprocessor controlled data enable focusing of a scanning beam onto a target object containing indicia and compensating for rapid movement of the indicia and varying distances relative to the scanning device.

None of the aforementioned patents disclose the utilization of an automatically oscillatable and electromagnetically-actuated focusing arrangement, such as an optical element or lens in conjunction with an aperture, relative to a generally stationary light beam projecting source of a scanning device so as to shift the focal point of the beam enabling the scanning of a target object containing indicia which is to be read over extremely widely differing scanning ranges.

As disclosed in at least some of the above mentioned patents, one embodiment of such a scanning system resides, inter alia, in a hand-held, portable laser scanning head supported by a user, which is configured to allow the user to aim the head, and more particularly, the light beam or laser beam projected therefrom, at a target and a symbol which is to be read.

The light source in a laser scanner is typically a gas laser or semiconductor laser. The use of semiconductor devices, such as a laser diode, as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For purpose of discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two dimensional bar codes; that is, the reader must be aimed at each row, individually. Likewise, the multiple-scan-line readers produce a number of scan lines at an angle to one another so these are not suitable for recognizing a Code 49 type of two-dimensional symbols.

In the scanning systems known in the art, the light beam is directed by a lens or similar optical components along a light path toward a target that includes a bar code symbol on the surface. The scanning functions by repetitively scanning the light beam in a line or series of lines across the symbol. The scanning component may incorporate a drive or scanning motor adopted to either sweep the beam spot across the symbol and trace a scan line across and past the symbol in a high-speed repetitive mode, or scan the field of view of the scanner, or do both.

Scanning systems also normally include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

The decoding process in known scanning systems usually work in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Laser scanners are not the only type of optical instrument capable of reading bar code symbols. Another type of bar code reader is one which incorporates detectors based upon charge coupled device (CCD) technology. In such readers, the size of the detector is larger than or substantially the same as the symbol which is to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

SUMMARY OF THE INVENTION

In general, this invention features a device for reading indicia on a target in which the indicia has regions of differing light reflectivity. The device has means for directing a light beam from the device toward the indicia; means for focusing the light beam being directed on the indicia and collecting reflected light from the indicia; means for scanning the light beam along a selectable angle; means operatively connected with the focusing means for continually varying the focus of the focusing means so as to enable the scanning device to read the indicia at various working distances between the scanning device and indicia; and means for controlling the focusing in operative correlation with means for controlling the maximum scanning angle of the light reflected against the indicia.

In essence, the invention is directed towards a scanning device adapted to control the scanning angle of the light beam which is projected against the indicia on the target, preferably through the intermediary of a microprocessor-controlled activation of the focusing arrangement enabling optimum focusing of the directed light beam so as to provide for a rapid and clear reading of the indicia on the target at widely different working ranges. The capability of controlling the scanning angle by means of the inventive scanning device further enhance the versatility thereof in that it enables obtention of a clear reading of such indicia within extreme variation in scanning ranges.

Accordingly, it is an object of the present invention to provide a scanning device of the type described incorporating an automatically adjustable focusing arrangement which will enable the scanning and reading of indicia on a target over a widely differing scanning ranges without losses in the quality of the scan.

Another object of the present invention is to provide a scanning device incorporating a modular structure having an optical element arranged therein which is axially reciprocable between two end positions responsive to actuation by an electromagnetically-energizable arrangement so as to enable a shifting of the focal point of the projected light beam to permit the scanning device to read indicia located at widely differing working distances between the device and indicia.

Still another object of the present invention is to provide for a scanning device as described herein which enables an accurate control over the scanning angle of the directed light beam so as to provide for a clear and high quality mode in the scanning and reading of indicia on a target, irrespective as to the operative scanning range employed by the device.

A further object of the present invention resides in the provision of an autofocusing scanning device in which microprocessor controlled circuitry is utilized for automatically controlling the scanning angle of the device in order to obtain maximum scanning and reading clarity and efficiency during operation of the device at widely differing working distances.

Yet another object of the present invention is to provide a novel method of varying the focal length of a beam for automatically controlling the scanning range of an autofocusing scanning device of the type described as herein.

BRIEF DESCRIPTION OF THE DRAWINGS

The foregoing and other objects of the present invention and features and advantages thereof may now be more clearly ascertained from the following detailed description of exemplary embodiments of the inventive scanning device, taken in conjunction with the accompanying drawings; in which:

FIG. 3 illustrates, generally diagrammatically, a scanning angle attained by current scanning devices at different scanning ranges;

FIGS. 4a and 4b illustrate the improved scanning angles attained for short and lengthier scanning ranges by the autofocusing scanning device pursuant to the invention;

DETAILED DESCRIPTION

Figures 1, 2:
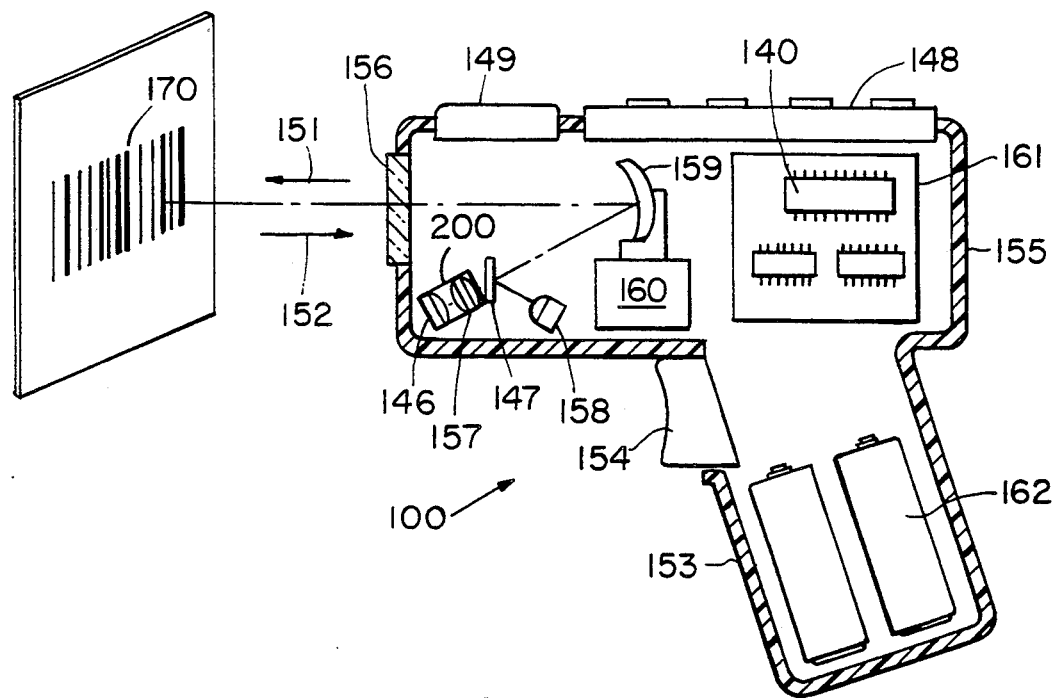
FIG. 1 illustrates a longitudinal sectional view through an exemplary embodiment of a laser scanning device incorporating the inventive optical arrangement for automatically varying and shifting the focus of the laser beam being projected against indicia on a target object, wherein the scanning device is in the shape of a hand-held gun-shaped component.
FIG. 2 illustrates, on an enlarged scale, a longitudinal sectional view through a modular structure incorporating the automatically focusing scanning components of the scanning device, which enables the shifting of the focus of the laser beam which is being projected.

Referring in more specific detail to the drawings, as diagrammatically illustrated in FIG. 1, pursuant to a typical exemplary embodiment, a laser scanning device may be a bar code reader unit 100 in a hand-held gun-shaped configuration, although obviously other kinds of configurations of scanners readily lend themselves to the invention, having a pistol-grip type of handle 153 and in which a movable trigger 154 is employed to allow the user to activate the light beam 151 and detector circuitry when pointed at the symbol to be read, thereby saving battery life if the unit is self-powered. A lightweight plastic housing 155 contains the laser light source, the detector 158, the optics and signal processing circuitry, (including a CPU) 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of from contact with the symbol to distances of perhaps several inches or even further therefrom.

As further depicted in FIG. 1, a suitable lens 157 (or multiple lens system) may be used to focus the scanned beam into the bar code symbol at an appropriate reference plane. A light source 146, such as a semiconductor laser diode, is positioned to introduce a light beam into the axis of the lens 157 (light source 146 and lens 157 being supported in housing 200), and the beam passes through a partially-silvered mirror 147 and other lenses or beam-shaping structure as needed, along with an oscillating mirror or scanning element 159 which is attached to a scanning motor 160 activated when the trigger 154 is pulled. An alternative optical arrangement is depicted in U.S. Pat. No. 5,015,833, which is hereby incorporated by reference. If the light produced by the source 146 is not visible, an aiming light, if needed, produces a visible-light spot which may be fixed, or scanned just like the laser beam; the user employs this visible light to aim the reader unit at the symbol before pulling the trigger 154.

In order to be able to utilize the scanning device to incorporate the zoom/autofocus capability; in essence, to be able to scan and read indicia on a target at various scanning ranges from the device, the reader 100 includes an inventive electromagnetic zoom arrangement for the optical system or lens 157, as shown in FIG. 1, so as to be able to shift the focus, i.e., the waist location, for a light beam or laser beam which is projected from the light source 146.

In order to accomplish the foregoing, as is particularly illustrated in FIG. 2 of the drawings, the electromagnetic autofocus/zoom arrangement provides for a housing structure 200 including a tubular body portion 202 which is preferably constituted from a non-metallic or plastic metal, such as teflon or the like, with an internal substantially cylindrical configuration. Fastened to one end of the tubular body portion 202 is the light source 146 for projecting a beam of light; for example, such as a laser diode connected to a suitable source of electrical energy; for instance, the battery 162, by means of wires 204. The light source or laser diode 146 is mounted in a sleeve 206, which may be brass, in either a screwthreaded engagement or in a close locking fit on the one end 208 of tubular housing body portion 202.

The opposite or second end 210 of the housing body portion 202 may have an annular recess 212 formed therein adapted to receive electrically-energizable wound coils 214 which are connected to a source for alternating-current electrical energy. This annular recess 212 forms an internal diameter 216 at the second end 210 of the tubular body portion 202 which is of a smaller diameter then the internal cylindrical diameter 218 of the body portion 202 extending towards the first end mounting the light source 146.

Arranged within the housing body portion 202 so as to be in sliding contact with the cylindrical surface 218 is the optical lens 157, or an equivalent optical focusing system, to which there is attached a permanent magnet 222 through the intermediary of an external connecting bushing 224 so as to be movable in conjunction with the optical lens 157. The magnet 222 has a central through opening 226 to permit the passage therethrough of the light or laser beam projected from the light source 146 through the focusing lens 157 towards the end 210 of the housing body portion 202. The optical lens 157 and magnet 222 which is fastened thereto by means of the bushing 224 is readily axially slidable within the internal confines of the cylindrical housing body portion 202 along the wall surface 218 in view of the low coefficient of friction which is present therebetween.

The second end 210 of the housing body portion 202 having the smaller internal diameter bore 216 has an outer end section of the bore 216 provided with a screwthreading 228 which is adapted to be engaged by complementary screwthread on a bushing 230, which is constituted of a non-ferrous metal or plastic material, and which is adapted to be threaded into or out of the bore 216. The external end surface of the bushing 230 is closed off by means of a light-transparent plate-shaped window 232 which will permit the unhindered through-passage of light therethrough, but seal off the interior of the housing 200 from the environment.

The end surface or face 234 of the optical lens 157 facing towards the light source 146 is contacted by a helical coil spring 238 proximate the perimeter of the lens 157, and with the spring 240 extending towards the light source 146 into an annular channel 240 between a sleeve 242 extending along surface 218 and a section of the light source 146. The magnet 222 is contacted by a second helical coil spring 244 extending between the surface 246 facing away from the lens 157 about the aperture 226 and the facing end surface 248 of the bushing 230. Consequently, in view of the foregoing arrangement providing a counteraction by the oppositely acting spring forces of coil springs 238 and 244, in combination with an axial differential alignment of bushing 230 within threaded bore 216, the optical element 157 and the magnet 222 which is fastened thereto, are maintained at a predetermined initial or reference axial position within the body portion 202 of the housing 200. This position determines a basic or reference location for the beam waist of a light or laser beam projected from the light source 146 through the optical lens 157, optical aperture 226 in the magnet 222, and the window 234 for the scanning and reading of indicia on a target object. Inasmuch as the interior of the housing 200 is sealed off with respect to the environment or external conditions thereof, the air contained within the housing essentially provides a cushion acting as a shock-absorbent medium in the event that the scanning device is dropped or subjected to sudden external impacts. This will protect the delicate optical components contained therein from such damage caused by external forces.

The scanning device or reader 100 pursuant to the invention is employable as an essentially adjustable angle/zoom scanner which will enable the scanning and reading of indicia located at distances from the scanning device of within a few inches or even contact up to a number of feet; for example, working ranges of from about 5 in. up to 15 ft. without the need for extensive modifications and/or incorporating additional components in the scanning device. Thus, in order to shift the focal point or beam waist of the light or laser beam projected from the light source 146 through the focusing lens 157 and the optical aperture 226 in the magnet 222, the invention contemplates the electrical energizing of the coils 214 so as to alternatingly electromagnetically attract and repel the magnet 22 so as to resultingly axially reciprocate the arrangement consisting of the optical lens 157 and the magnet 222 with the aperture 226 within the confines of the tubular housing body portion 202 along the internal cylindrical wall surface 218 thereof. In order to effectuate the foregoing, an energizing alternating current is applied to the coils 214 through suitable electrical leads 250 which are connected to a source of such electrical power, possibly that supplying the light source 146, so as to impart an electromagnetic current of reversing polarity to the magnet 222. This reciprocatory movement of the lens 157 and magnet 222 within the body portion 202 of the housing 200 acts in opposition to the restoring or equilibrating forces of the coil springs 238 and 244 tending to return the optical lens 157 and magnet 222 to an initial equilibrium position at which the beam waist is at a predetermined range. In order to attain the desired working ranges, the extent of axial reciprocatory displacement of the arrangement consisting of the optical lens 157 and magnet 222 is approximately ±15 mm from the equilibrium position; and the alternating current applied to the electromagnetic coils 214 is generally within an operating frequency of about 2–5 Hz, well below the normal scanning frequency of about 18 Hz for a typical scanning device of this type. Consequently, this will provide for a substantially automatic zooming action in a continuous mode such that during a scanning operation the projected light or laser beam will be appropriately focused across the indicia being read by the scanning device, irrespective of the distance of the latter from the indicia.

In addition to the foregoing, the inventive structure 200 for providing the autofocus/zoom operation for the scanning device also facilitates adjustment of the scanning angle of the beam so as to improve clarity of the scan and thereby optimize the quality of the indicia reading capability of the arrangement at various working ranges responsive to the axial reciprocatory displacement of the focusing lens 157.

Thus, presently employed scanning devices, having reference to FIG. 3 of the drawings, generally each provide for a fixed scanning angle during their scanning operations, whereby a target object at a closer working range is scanned at a narrower angular width or diffusion relative to a target object in contrast with indicia located at a greater distant scanning range. This adversely affects the quality of the scan at greater distances, for example, at 12 to 15 feet compared to distances of a few inches to 1 or 2 feet for the same scanning device. The ability to provide for smaller or narrower scanning angles and/or lower frequencies for indicia such as bar codes which are located further away provide the advantage that since a constant angle translates to longer scan paths at longer distances, this effectively increases the band width requirements of the system.

Thus, in scanning devices which have a zoom-/autofocus capability by incorporating the arrangement 200 as described hereinabove, a signal is emitted in order to determine the location of the beam waist "Z-drive". A relayed signal can control the maximum angle; and under certain instances, also possibly the frequency of operation of the scan element.

Thus, by employing a system as described hereinbelow, the angle $\alpha$ for the scanning angle for short distances, as shown in FIG. 4a, is essentially such that the angle $\alpha_2$ for lengthier distances as shown in FIG. 4b is such that the latter produces for a narrower scan angle or band width responsive to the variation in the focal length to a point due to the displacement of the lens so as to provide an improvement in the scanning clarity.

Thus, the maximum scan velocity $V_s$ is approximately given by the formula:

$$V_s + 4\pi f_{scan} a_{max} Z;$$

in which $f_{scan}$ is the number of scans/sec, $a_{max}$ is the maximum angular deviation of the scan mirror and Z is the distance from the scan element to the indicia being read by the device.

Thus, the dwell time for an indicia, or a bar code element with a width x is as follows:

$$t_x = \frac{X}{V_s} = \frac{X}{4\pi f_{scan} a_{max}} \cdot \frac{1}{Z}$$

Accordingly, it would be desirable to reduce the dependence of t on Z, and this can be accomplished by modifying either $f_{scan}$ or $a_{max}$.

Figure 5:
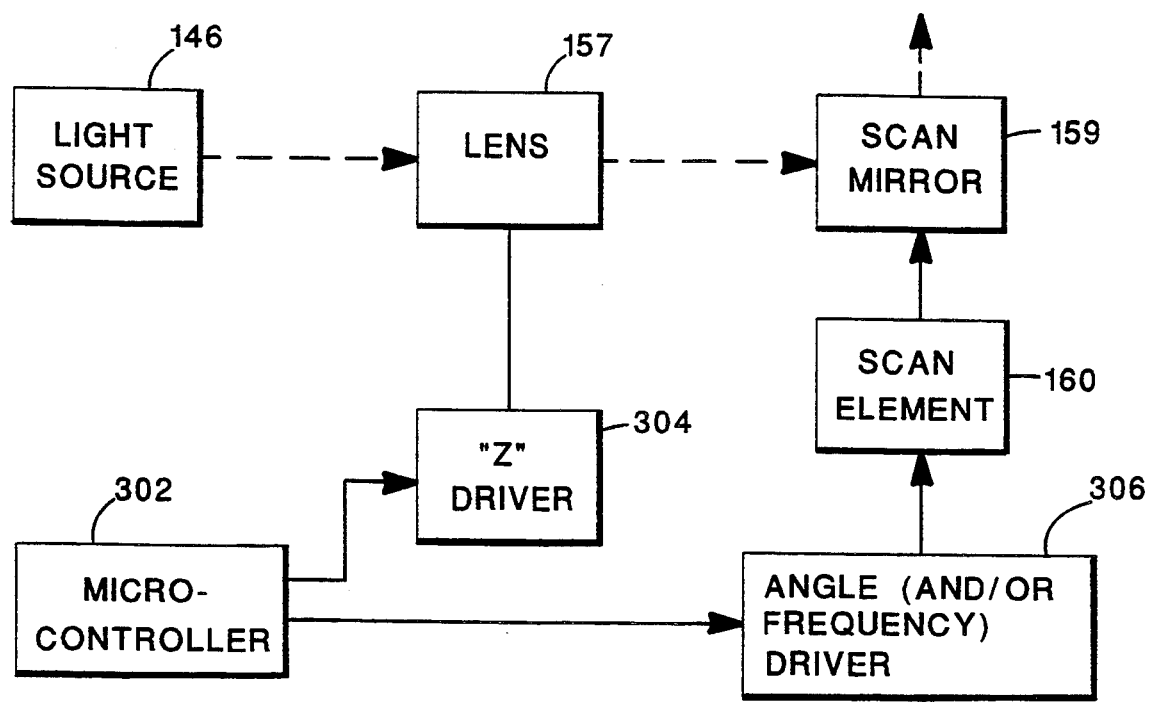
FIG. 5 illustrates a circuit arrangement for the microprocessor-controlled operation of the autofocusing scanning device with the variable focus to obtain the scanning angles of FIGS. 4a and 4b.

As shown in FIG. 5 of the drawings, the lens 157 which receives the beam of light from the light source or laser diode 146 transmits this light through the aperture 226 to a suitable scan mirror 159; while a microcontroller 302 (part of electronic 140 in FIG. 1) provides input to a Z-driver 304 which is operatively connected to the lens 157 and concurrently provides information to an angle and/or frequency driver 306 providing communication with a scanning motor 160 and scan mirror 159 to enable automatic shifting of the focal point or beam waist in dependence upon the distance of the indicia or bar code from the lens 157.

Alternatively, the microntroller 302 could impart information to the Z-driver 304 in order to displace an optical element other than lens 157, which would remain in a fixed position rather than being reciprocated as shown in the embodiment of FIG. 2 of the drawings.

In summation, the foregoing enables the provision of a scanning device with autofocus/zoom capabilities and angular variation of the scan beam through an electromagnetic arrangement for changing the position of an optical element; and in which a hole in a magnet connected to the optical element and movable therewith forms an optical aperture limiting f number for the system.

The small, lightweight and short-stroke reciprocable arrangement for the optical element and magnet allows for fast zoom action in which all ranges of scan, and an all density scanner can be attained through the oscillatory zoom device combined with a fast "X" scanner, the latter of which may be a standard 18 Hz scanner.

From the foregoing, it becomes readily apparent that the present device is directed to a unique and universally applicable autofocus/zoom scanning arrangement enabling a single device of relatively simple and inexpensive construction to be employed for the highly efficient, high-speed and accurate scanning of indicia or symbols located at widely differing working ranges from the device.

While there has been shown and described what are considered to be preferred embodiments of the invention, it will, of course, be understood that various modifications and changes in form or detail could readily be made without departing from the spirit of the invention. It is therefore intended that the invention be not limited to the exact form and detail herein shown d described, nor to anything less than the whole of the invention herein disclosed as hereinafter claimed.

What is claimed is:

1. A device for reading indicia on a target in which the indicia has regions of differing light reflectivity comprising means for directing a light beam from said device toward said indicia; means for focusing said light beam being directed on said indicia to set the location of the beam waist and collecting reflected light from said indicia; means for scanning said light beam along a selectable maximum angle; means for continually varying the location of the beam waist and the maximum scanning angle as to enable said scanning device to read said indicia at various working distances between said scanning device and indicia, wherein the variation in the location of the beam waist is in dependent relationship with the variation in the maximum scanning angle of the light.

2. A scanning device as claimed in claim 1, wherein said means for fosucing comprises an optical element and an electromagnetic actuating means for changing the position of said optical element relative to said means for directing the light towards the indicia.

3. A scanning device as claimed in claim 2, wherein said means for focusing comprises a unitary housing for said light directing means, said optical element and said electromagnetic actuating means, said electromagnetic actuating means including a magnet having an aperture being fastened to said optical element for concurrent axial movement therewith within said housing relative to said light directing means, said housing having an opening in a first end thereof distant from said light directing means; and electromagnetic coil means encompassing said housing in the region about said magnet whereby an electrical alternating-current supplied to said electromagnetic coil imparts a reciprocatory movement to said magnet and said optical element within said housing for varying the focus of the light directed against the indicia.

4. A scanning device as claimed in claim 3, wherein resilient means normally impart a restoring force to said magnet and optical element for biasing components into a predetermined position within said housing relative to said light directing means opposite the force of an electrical current imparted to said electromagnetic coil means causing reciprocatory movement of said magnet and optical element within said housing for varying the focus of the light beam.

5. A scanning device as claimed in claim 4, wherein said resilient means comprises spring members imparting oppositely directed axial forces against respectively said magnet and said optical element.

6. A scanning device as in claim 5, wherein each said spring member comprises a helical compression spring.

7. A scanning device as claimed in claim 3, wherein said optical element comprises at least one optical focusing lens.

8. A scanning device as claimed in claim 3, wherein said housing comprises a cylindrical member having a cylindrical bore, said optical element and magnet being slidable supported within said cylindrical bore.

9. A scanning device as claimed in claim 8, wherein said optical element and magnet haven an axially reciprocating movement of about $\pm 15$ mm imposed thereon by said electromagnetic actuating means so as to produce a variation in the focal point of a scanning beam of said directed light within the range of from about 5 inches to about 15 feet.

10. A scanning device as claimed in claim 3, wherein said magnet comprises a permanent magnet.

11. A scanning device as claimed in claim 3, wherein said light directing means is mounted on said housing so as to be axially adjustable relative to said optical element.

12. A scanning device as claimed in claim 1, wherein said light directing means comprises a laser generator for projecting a laser beam against said indicia.

13. A scanning device as claimed in claim 9, wherein said electromagnetic actuating means reciprocates said optical element and magnet at a shifting frequency with the range of about 2-5 Hz.

14. A scanning device as claimed in claim 3, comprises means for controlling the reciprocatory movement of said optical element in operative correlation with said means for controlling the maximum scanning angle of the light reflected against the indicia on a target.

15. A scanning device as claimed in claim 14, wherein said means for controlling the reciprocatory movement of said optical element comprises a computerized microcontroller.

16. A method of reading indicia on a target in which the indicia has regions of different light reflectivity, comprising directing light towards said indicia and collecting reflected light from said indicia; focusing said light being directed on said indicia to set the location of the beam waist of said light; scanning said light beam at a selectable maximum scanning angle; and continually varying the location of the beam waist and the maximum scanning angle of said directed light so as to enable said directed light to scan said indicia at various scanning ranges, wherein the variation in the location of the beam waist is in dependent relationship with the variation in maximum scanning angle of the light beam.

17. A method as claimed in claim 16, wherein said light is focused through an optical element and an electromagnetic actuating arrangement for changing the position of said optical element relative to the light being directed towards the indicia.

18. A method as claimed in claim 17, comprising varying the focus of said directed light within a unitary housing for conducting said light containing said optical element and said electromagnetic actuating arrangement, said electromagnetic actuating arrangement including a magnet having an aperture and being fastened to said optical element for concurrent axial movement therewith, said housing having an opening in a first end thereof; and electromagnetic coil means encompassing said housing in the region about said magnet; and applying an electrical alternating-current to said electromagnetic coil means to impart a reciprocatory movement to said magnet and said optical element within said housing for varying the focus of the light directed against the indicia on the target.

19. A method as claimed in claim 18, wherein said magnet and optical element are normally biased into a predetermined position within said housing relative to a source for said directed light; the application of said electrical current to said electromagnet coil means imparting reciprocatory movement to said magnet and optical element opposite a restoring biasing force so as to vary the focus of the light, and wherein said biasing force is produced by spring members imparting oppositely directed axial forces against respectively said magnet and said optical element.

* * * * *